Patented Apr. 5, 1938

2,113,195

UNITED STATES PATENT OFFICE 2,113,195

GLASS BATCH

Francis C. Flint, Zanesville, Ohio, assignor to Hazel-Atlas Glass Company, Wheeling, W. Va., a corporation of West Virginia No Drawing. Application March 6, 1936, Serial No. 67,552

5 Claims. (Cl. 106—36.1)

The invention relates to a new batch for producing in large quantities a glass of superior quality, particularly container glass or window glass.

In the past the requirements with respect to the color and brilliance of container glass have not been very severe. Bottles, tumblers and the like were acceptable even if the glass was rather dull and of poor color; but in recent years the requirements with respect to container glass and the like have become more and more rigid.

It is not so difficult to produce in small amounts a transparent glass having good color and brilliance but great difficulty is involved in producing inexpensively such a glass for ordinary bottles and the like, where the glass is made in continuous tanks having a capacity of many tons.

In the manufacture of glass of this character where sulphates are employed, such as sodium sulphate, barium sulphate, strontium sulphate, etc., it is necessary to reduce the sulphates to sulphites, thereby releasing the sulphur as sulphur dioxide, and permitting the silica to combine with the soda.

The reducing agent commonly employed is carbon, but its use is not entirely satisfactory where glass of particularly good color and brilliance is to be produced in large quantities. For example, if too much carbon is used the resulting glass will be somewhat dull, with a brown or gray cast. While if too little carbon is used some of the sulphate is not reduced, thereby lessening the effect of the decolorizer or producing seed, gall or stones. Hence the common practice has been to employ an excess of carbon, for fear there would not be sufficient to completely reduce the sulphate.

In accordance with the present invention I employ a reducing agent which may be freely used in sufficient quantity to assure the complete reduction of the sulphate, such as sodium sulphate, barium sulphate, or strontium sulphate, but which will not produce any undesirable effect on the resulting glass even if an excess of the reducing agent is employed. In other words, I employ a reducing agent which of itself produces no ill effect upon the glass if some of it remains in the glass, which of course is not true of carbon.

This highly desirable result is attained, I find, by the use of certain metals as reducing agents, such as metallic zinc, magnesium, alumina or tin. No one of these metals adds any color to the resulting glass, if used in reasonable quantities. That is, any one of these metals, or any combination of them, can be used in sufficient quantity to produce complete reduction of the sulphate, together with a reasonable extra amount as a factor of safety, without any effect upon the glass color. I find that the character of the glass is not influenced if the batch includes as much as one per cent of these metals, and that is a much greater percentage than is necessary to insure complete reduction of the sulphate. It is therefore apparent that a sufficient quantity of these metals can be employed, with some extra as a safety factor, to assure the complete reduction of the sulphate, thus avoiding any possibility of sulphate remaining to lessen the effect of the decolorizer or to produce seed, gall or stones; and on the other hand any excess of the metal reducing agent not producing any undesirable effect upon the glass, such as a dull effect or a brown or gray cast, such as is produced by an excess of carbon. By the use of a reducing agent which does not affect the color of the glass, such as metallic zinc, magnesium, alumina or tin, I am able to produce, in large quantities, a container glass of unusually good color and brilliance. And I am able to do this without any unusual accuracy or care in determining an exact amount of the reducing agent to be employed in a particular batch, for as mentioned above it is not disadvantageous to employ more than is actually required. The only requirement, within reasonable limits, is that a sufficient amount of the reducing agent be employed.

There is given below, merely as an example, a formula for container glass employing barium sulphate, and metallic zinc as a reducing agent:

| | Pounds |
|---|---|
| Sand | 1000 |
| Soda | 350 |
| Limestone | 200 |
| Barium sulphate | 50 |
| Arsenic | 5 |
| Metallic zinc | 5 |

Of course the invention is in no manner limited to the particular proportions listed above, and while the above formula includes barium sulphate, it will be understood that the invention includes other sulphates, such as sodium sulphate or strontium sulphate. Likewise, the above formula includes metallic zinc as the reducing agent, but the invention also includes metallic tin, alumina or zinc, or any combination of the several metals mentioned, no one of which metals affects the color of the glass. In its broadest aspect the invention relates to the use, in the manufacture of container glass and the like, of a reducing agent which will not influence the character of the glass if the batch contains considerably more of the reducing agent than is necessary for complete reduction of the sulphate. The usual decolorizers are employed, selenium or manganese.

What I claim is:

1. A glass batch for colorless transparent container glass and the like including barium sulphate and a metallic reducing agent for the barium sulphate, such reducing agent consisting of a metal which will not influence the character of the colorless transparent container glass if used in excess of the amount required for complete reduction of the barium sulphate.

2. A glass batch for colorless transparent container glass and the like including barium sulphate and a reducing agent for the sulphate consisting of zinc.

3. A glass batch for colorless transparent container glass and the like including barium sulphate and a reducing agent for the sulphate consisting of magnesium.

4. A glass batch for colorless transparent container glass and the like including barium sulphate and a reducing agent for the sulphate consisting of alumina.

5. A glass batch for colorless transparent container glass and the like including barium sulphate and a reducing agent for the sulphate consisting of tin.

FRANCIS C. FLINT.